United States Patent
Cairns et al.

[11] 3,716,409
[45] Feb. 13, 1973

[54] CATHODES FOR SECONDARY ELECTROCHEMICAL POWER-PRODUCING CELLS

[75] Inventors: Elton J. Cairns, Downers Grove, Martin Kyle, Wheaton, Hiroshi Shimotake, Hindsdale, all of Ill.

[73] Assignee: The United States of America as represented by the United States Atomic Energy Commission

[22] Filed: Sept. 8, 1971

[21] Appl. No.: 178,577

[52] U.S. Cl.................................136/6, 136/20
[51] Int. Cl..................................H01m 35/00
[58] Field of Search......136/6, 100 R, 83 R, 20, 137, 136/86

[56] References Cited

UNITED STATES PATENTS

| | | | |
|---|---|---|---|
| 3,413,154 | 11/1968 | Rao | 136/100 R |
| 3,463,670 | 8/1969 | Rao et al. | 136/83 R |
| 3,488,221 | 1/1970 | Shimotake et al. | 136/20 |
| 3,531,324 | 9/1970 | Fischer et al. | 136/20 |
| 3,532,543 | 10/1970 | Nole et al. | 136/6 |

*Primary Examiner*—Anthony Skapars
*Attorney*—Roland A. Anderson

[57] ABSTRACT

A secondary electrochemical power-producing cell including an anode containing lithium, an electrolyte containing lithium ions, and a cathode containing sulfur. The cathode comprises plates of a porous substrate material impregnated with sulfur alternating with layers, which may also comprise porous substrate plates, containing electrolyte. The cathode may further be encased in additional electrolyte-impregnated porous material. The cathode may also comprise a metal housing having an orifice at one end, a plate of porous substrate material impregnated with sulfur sealing the orifice, and a layer of electrolyte-impregnated porous substrate material mounted on the exterior surface of the sulfur-impregnated plate, liquid sulfur being located within the housing enclosure.

22 Claims, 9 Drawing Figures

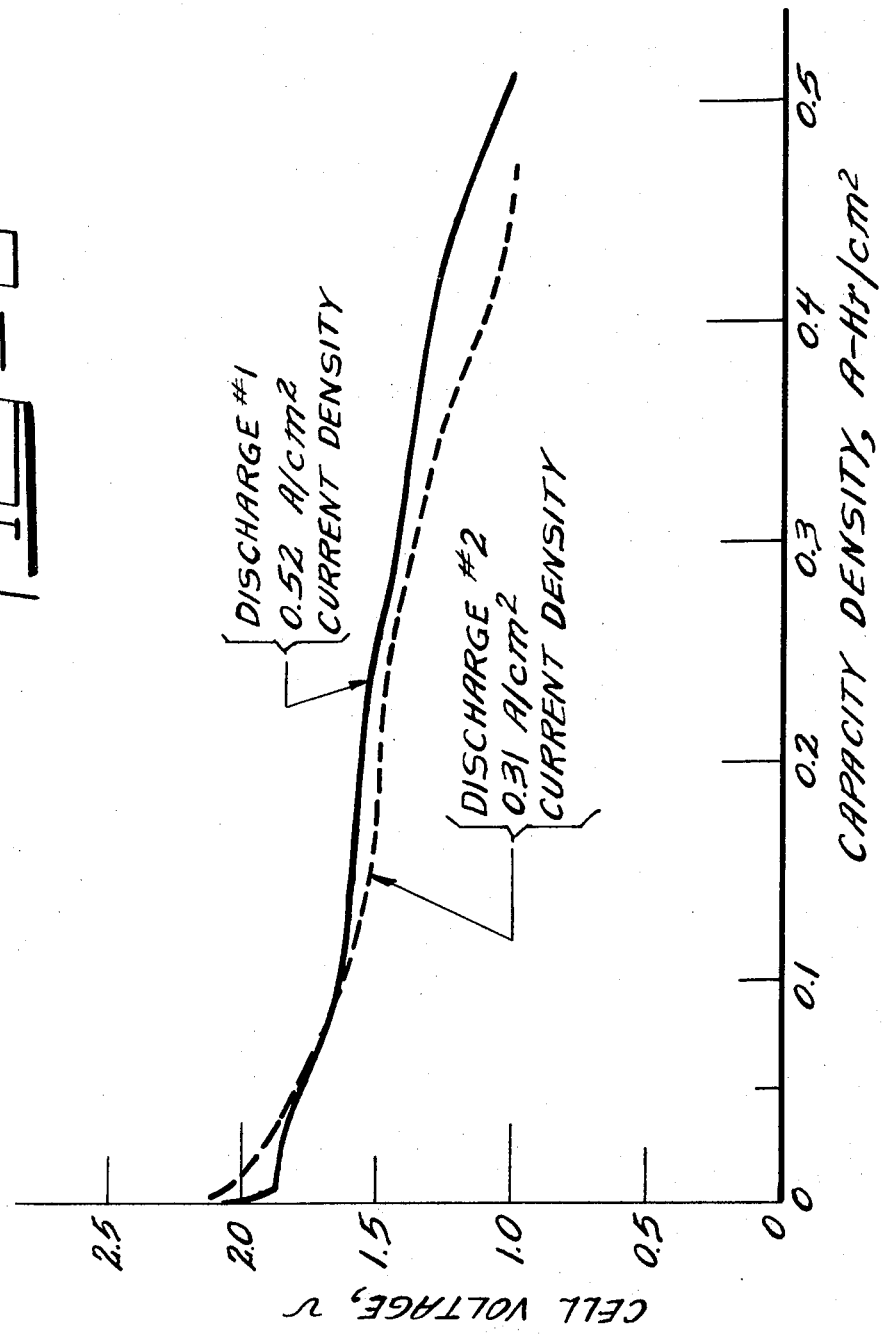

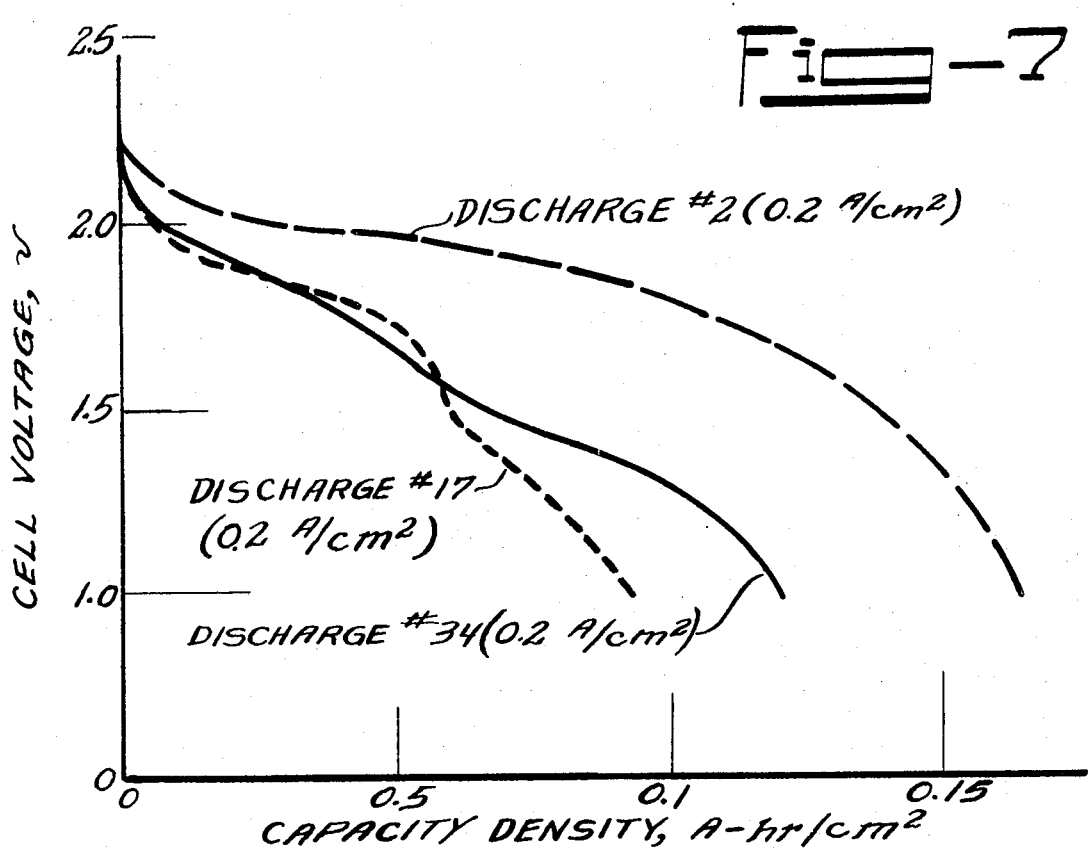
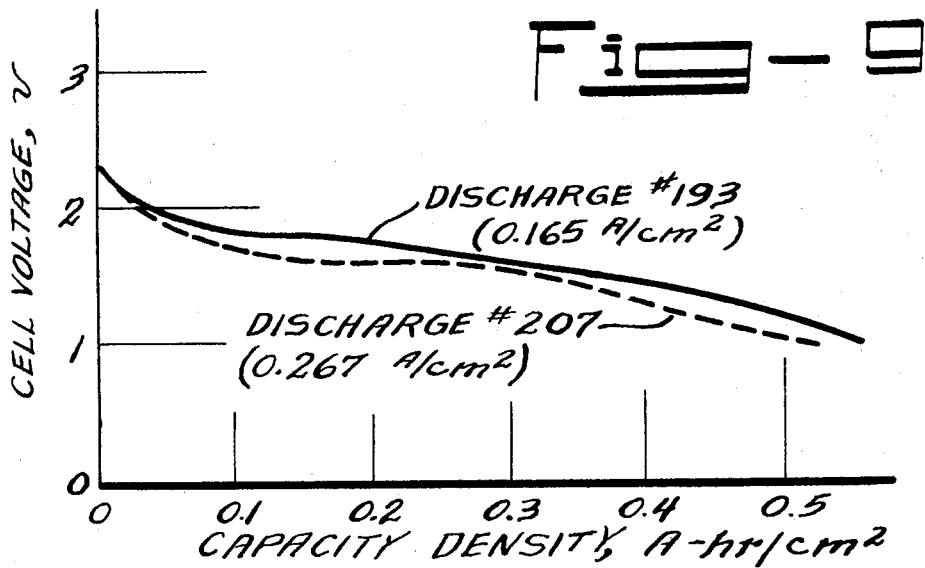

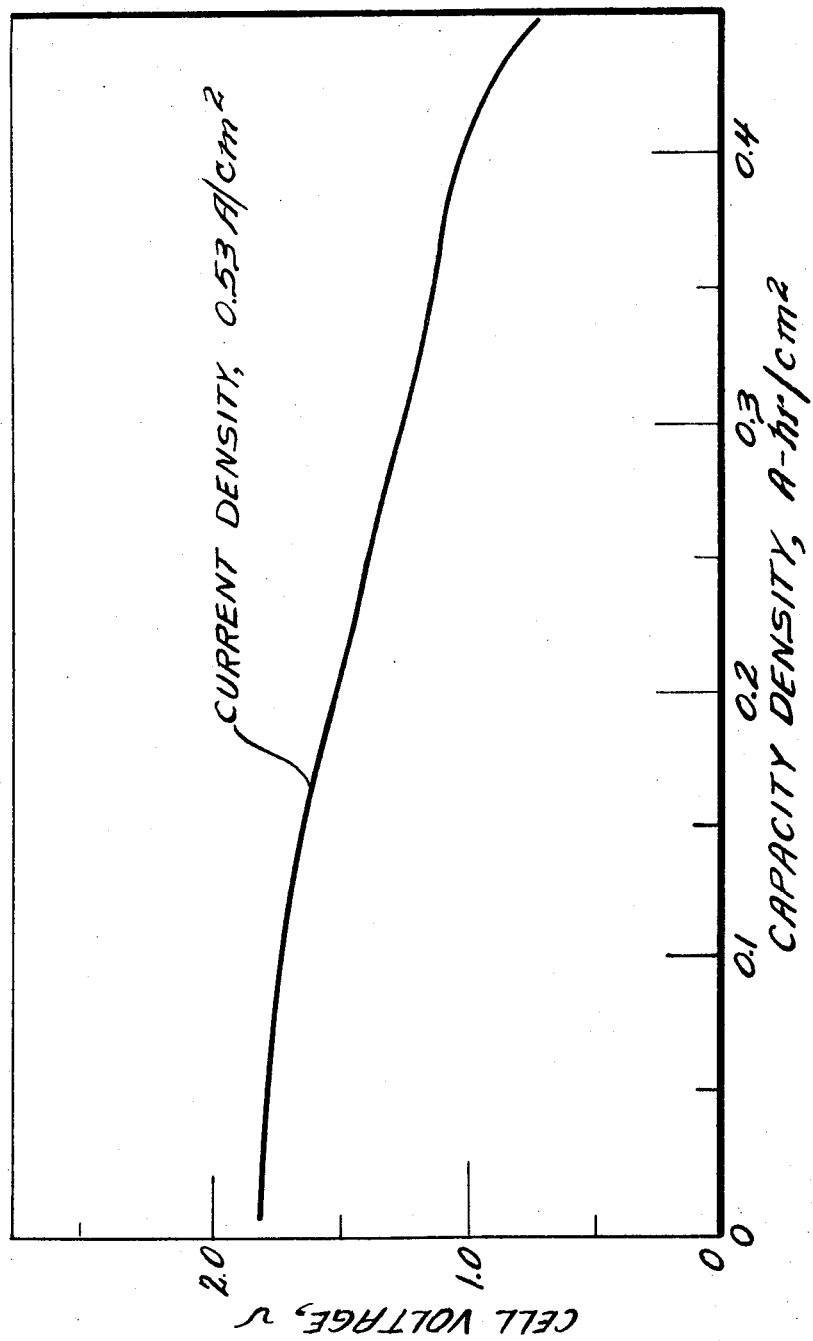

CATHODES FOR SECONDARY ELECTROCHEMICAL POWER-PRODUCING CELLS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an electrochemical power-producing cell and more particularly to a lithium/sulfur secondary cell having high current densities, high capacity densities and a long cycle life. In more detail, the invention relates to a lithium/sulfur cell having an improved cathode structure wherein the sulfur-electrolyte-current collector interface is significantly improved and sulfur loss from the cathode greatly reduced.

In our technologically-oriented society, there is an increasing need for compact, convenient, pollution-free electrical power sources and energy-storage devices. A large number of power-source needs, both civilian and military, have gone unfulfilled because of the limited capabilities of presently-available batteries and engine-generators. In our attempt to satisfy these needs, a great deal of effort has been expended over the last decades in areas of energy conversion and energy storage. A large portion of the effort has involved electrochemical devices such as fuel cells, metal/air cells, secondary (electrically rechargeable) cells with both aqueous and nonaqueous electrolytes, and thermally regenerative cells.

Although a wide variety of electrochemical cells is available, none presently in existence can be utilized for applications requiring a high specific energy (watt-hours per kilogram; W-hr/kg) and a long cycle life (number of charge/discharge cycles before failure). One such application is a battery power source for an electrically-powered vehicle. For such an application, however, the high specific energy requirement must be achieved without sacrificing peak specific power (watts per kilogram; W/kg). Depending upon the design and materials of an electric passenger vehicle, a range approaching 200 miles and an acceptable acceleration capability would require a battery having a specific energy of at least 200 W-hr/kg and a peak specific power of at least 200 W/kg. The cycle life must approach 300 cycles so as to make the battery economically feasible.

The only class of cells which shows promise for development into high-specific-energy, high-specific-power secondary batteries consists of cells that operate at elevated temperatures. These cells employ lithium or sodium anodes (of low electronegativity, low equivalent weight, and high exchange-current density), molten-salt or cation-conducting solid electrolytes, and cathode materials of groups VI or VII of the periodic chart, the chalcogens and halogens (of high electronegativity, moderate-to-low equivalent weights and high exchange-current densities). Of this class of cells, the lithium/sulfur cell having an electrolyte of low-melting salt containing lithium ions has proven to be very promising.

Turning specifically to the lithium/sulfur cell, the over-all reaction which occurs upon discharge of such a cell, assuming the end product to be lithium sulfide ($Li_2S$), is $$2 Li + S \rightarrow Li_2S \quad (1)$$

Under most operating conditions, the $Li_2S$ is soluble in the excess sulfur at the cathode. However, $Li_2S$ is allowed to precipitate during the later stages of discharge, the $Li_2S$ redissolving upon recharging of the cell. While $Li_2S$ is the final end product after the cell has been totally discharged, it should be noted that prior to total discharge it is believed that intermediaries with more than one sulfur atom per two lithium atoms in addition to $Li_2S$ are formed. The general formula for such lithium sulfides is $Li_xS_y$, and this will be utilized throughout the specification unless the final end product, $Li_2S$, is appropriate.

The electrode reactions during discharge which correspond to the over-all cell reaction given above are $$\text{Anode: } Li \rightarrow Li^+ + e^- \quad (2)$$

$$\text{Cathode: } 2 Li^+ + S + 2 e^- \rightarrow Li_2S \quad (3)$$

At the anode, lithium is oxidized to lithium cations which migrate through the lithium-ion-containing electrolyte to the cathode, the electrons passing through the electrical circuit. At the cathode, lithium cations from the electrolyte are neutralized by electrons from the electrical circuit, forming thereby lithium atoms which react immediately with the sulfur in the cathode to form lithium sulfide ($Li_xS_y$). The $Li_xS_y$ cell product, which is soluble in the excess sulfur, must diffuse away from the cathode/electrolyte interface in order to allow additional sulfur to contact the electrolyte. However, the high viscosity of sulfur and its tendency to form polymer chains inhibit the diffusion of $Li_xS_y$ away from the interface, and slow diffusion of the reaction product limits the rate of the cathode reaction. As the cell is further discharged, $Li_xS_y$ accumulates in the cathode, finally exceeds the solubility limit, and precipitates. At this point, the cell voltage becomes constant, and solid $Li_2S$ accumulates until the cathode is completely solid. Normally, however, the cell is not discharged to the point of solidification because the buildup of $Li_xS_y$ at the cathode/electrolyte interface increases the diffusion overvoltage and the internal resistance of the cell, causing the cell voltage to decrease below some lower limit (1 volt) before all of the sulfur is reacted. Upon recharging of the cell, the reverse of these processes occurs with lithium cations migrating back to the anode.

There are numerous variables which affect cell performance, among these being interelectrode distance, electrolyte composition and anode/cathode structure and material composition. The low electrical conductivity of sulfur interferes with the cathode reaction because it limits the rate at which electrons are transported to the sulfur-electrolyte interface, thereby limiting the extent to which the interface is useful. The cathode current collector is a porous electronically-conducting structure which provides a path for electrons to reach the interface, helping thereby to overcome somewhat the electron transport limitation of sulfur. The current-collector geometry, however, has somewhat conflicting requirements. A small-pore-size body provides more and shorter electron paths through the sulfur. If, however, these pores are too small, they will inhibit the $Li_xS_y$ diffusion rate and lower the cell performance. Because of these conflicting requirements for current collection and mass transport, the cathode structure and material composition is of particular importance.

Current densities (amperes/cm² of cathode surface area projected down upon the anode) and capacity densities (ampere-hours/cm²) for lithium/sulfur cells are, then, a function in part of the cathode structure and composition. These operating characteristics are important, for high current densities are necessary to achieve high power densities, and high power densities in turn permit high specific power. Correspondingly, high capacity densities are needed for high specific energy. To achieve the cell performance required by electric vehicles, capacity densities of about 0.4 A-hr/cm² at current densities of around 0.3 A/cm² are required for individual cells. Therefore, there is a continuing search for new electrochemical cell configurations, including cathode structures and materials, which can deliver such capacity and current densities. While the present invention concerns new and novel cathode structures for lithium/sulfur cells which greatly increase cell performance in terms of high current densities, high capacity densities and long cycle life, such cells are not yet completely satisfactory for electric vehicle battery use in that the stated performance must be achieved with about one-third the present cathode volume in order to satisfy the performance requirements of electric vehicles. Accordingly, a search for other cell and cathode configurations and for improvements upon the present invention must continue in addition to continued development in other problem areas, including that of anode structure and composition. Of course, the present invention, although developed for a specialized need, may in fact have much wider applicability and use in other situations where secondary electrochemical cells are being utilized or investigated.

It is, therefore, an object of this invention to provide improved cathodes for secondary electrochemical cells, and specifically for lithium/sulfur cells.

It is another object of this invention to develop secondary electrochemical cell cathode structures capable of use in electrically powered vehicle batteries.

It is a further object of this invention to provide a cathode for lithium/sulfur electrochemical cells which extends and improves the sulfur-electrolyte-current collector interface and reduces sulfur loss from the cathode.

It is finally an object of this invention to provide new and novel cathode structures for a lithium/sulfur secondary electrochemical cell which enable the cell to achieve a capacity density of approximately 0.4 A-hr/cm² at a current density of about 0.3 A/cm² and a cycle life approaching 300 cycles.

FUrther objects and advantages of the invention will be apparent from the following detailed description of the lithium/sulfur cell cathode.

SUMMARY OF THE INVENTION

According to the present invention, a cathode comprising essentially parallel plates of a porous substrate material impregnated with sulfur alternating with layers containing electrolyte is employed in a lithium/sulfur secondary electrochemical cell comprising an anode containing lithium, an electrolyte containing lithium ions and a cathode containing sulfur. The layers containing electrolyte may be plates of a porous substrate material impregnated with electrolyte. This laminated structure may further be completely encased in a layer of electrolyte-impregnated porous material. In addition, a cathode having an electrically conducting, sulfur and $Li_xS_y$-resistant housing with an orifice at one end, a plate of sulfur-impregnated porous substrate material secured to the housing and sealing the orifice, a layer of electrolyte-impregnated porous substrate material mounted to the exterior surface of the sulfur-impregnated plate, and sulfur contained within the housing enclosure in contact with the inner surface of the sulfur-impregnated plate may in the alternative be employed with the above lithium/sulfur electrochemical cell. These embodiments improve and extend the sulfur-electrolyte-current collector interface and reduce cathode sulfur loss, thereby enabling the lithium/sulfur cell to achieve capacity densities of 0.4 A-hr/cm² at current densities of 0.3 A/cm² and a cycle life of about 300 cycles.

BRIEF DESCRIPTION OF THE DRAWINGS

FIG. 6 is a graph showing the voltage vs. capacity density characteristics for a Li/S cell having a laminated cathode.

FIG. 7 is a graph showing the voltage vs. capacity density characteristics for a Li/S cell having an enclosed laminated cathode.

FIG. 8 is a graph showing the voltage vs. capacity density characteristics for a Li/S cell having a comb cathode.

FIG. 9 is a graph showing the voltage vs. capacity density characteristics for a Li/S cell having a reservoir cathode.

DETAILED DESCRIPTION OF THE INVENTION

Figure 1:
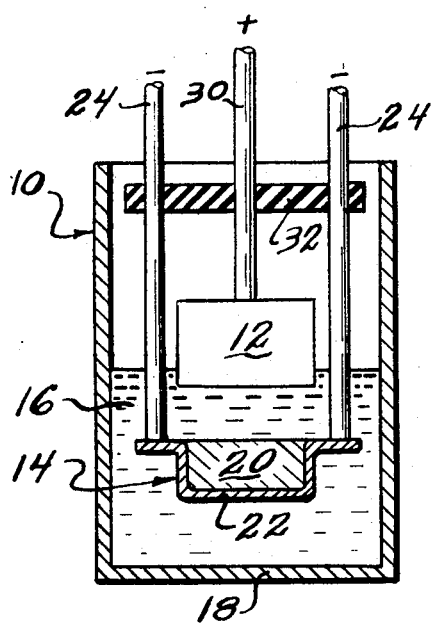
FIG. 1 is a schematic view of a cell used experimentally to test and prove operability of the present invention.

Referring first to FIG. 1, secondary cell 10 includes a cathode 12 and an anode 14 separated by molten-salt electrolyte 16. These are contained within alumina or niobium crucible 18. Anode 14 includes anode current collector 20 disposed within stainless steel or niobium anode cup 22 to which are attached electrical leads 24. Cathode 12 has electrical lead 30 attached thereto. To ensure proper electrical insulation, leads 24 are insulating from lead 30 by an insulating spacer 32.

For all tests, unless stated otherwise in the specification, anode current collector 20 comprises Type 302 porous stainless steel matrix, having 90 percent porosity and 67 $\mu$ ave. pore size, soaked or impregnated with lithium. This anode current collector structure, however, is merely for testing purposes, the present invention not being limited thereto. The porous stainless steel matrix referred to is composed of a random array of stainless steel fibers compressed in a random fashion and sintered at high temperatures, thereby creating a porous metal. One particular type of such porous stainless steel matrix is termed Feltmetal, a trade-marked material. It will be appreciated that, while Feltmetal was utilized during these tests, other porous metals of the same general type may be substituted therefor.

Choice of electrolyte 16 is quite varied. In general, in order to minimize the operating temperatures of the cell, the eutectic composition is preferred for whatever salt system is chosen. Obviously, if the melting point of the cathode material is higher than the melting point of the salt eutectic, then other salt compositions may be used without raising the operating temperature of the cell. The electrolyte must contain lithium ions, and the following is a partial list of known binary and ternary eutectics which can be utilized with the present invention as electrolyte 16.

| | |
|---|---|
| LiF-LiCl-LiI | LiF-LiCl |
| LiF-LiCl-KBr | LiF-LiI |
| LiF-LiCl-KI | LiF-KBr |
| LiF-LiI-KI | LiCl-LiI |
| LiCl-LiI-KI | LiI-KI |
| LiCl-KCl-RbCl | LiBr-KI |
| | LiBr-RbBr |

In addition to the above prior art eutectics, four new electrolyte compositions have been found which operate exceptionally well with the present invention in a lithium/sulfur secondary cell. These are LiF-LiCl-KCl, LiCl-KCl-KI, LiCl-KCl-CsCl, and LiF-LiCl-KCl-KI. The applicability of these electrolytes to other electrochemical cells is not known. However, in use with the lithium/sulfur cell, these electrolytes provide low electrolytic resistance and very little corrosion of the sulfur-containing cathode, while lithium has a very low solubility in these eutectics.

Figure 2:
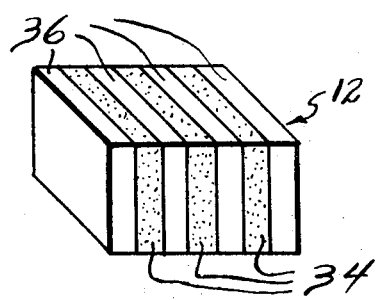
FIG. 2 is a view of an embodiment of the resent invention including a laminated cathode.

FIG. 2 is a view of one particular embodiment of the present invention whereby cathode 12 comprises plates 34 composed of a porous substrate material soaked or impregnated with sulfur alternating with plates 36 which are also composed of a porous substrate material but soaked or impregnated with electrolyte. For testing purposes, this structure was placed in a housing (not shown) which was connected to lead 30 of FIG. 1, this housing being constructed from any electrically-conducting material resistant to sulfur, $Li_xS_y$ and the particular electrolyte being used, such materials including molybdenum, niobium, chromium, high-density carbon and chrome-plated chrome-plated This housing enclosed cathode 12 in such a manner as to allow only the bottom surface of the cathode to be in direct contact with the electrolyte 16. The plates are of equal depth and height, the actual size depending upon the size of the cell itself. The plates utilized in testing were generally 11 × 11 mm. The thickness and number of plates will vary depending upon the size of the anode and of the desired cathode surface area projected down upon the anode. In addition, the sulfur-bearing plates may be of the same or different thickness than that of the electrolyte-bearing plates. There were generally 9 plates utilized in testing, there being one more electrolyte-bearing than sulfur-bearing plate, and the thickness of the plates varied from 0.45 mm to 1.9 mm, the projected cathode area varying from 0.71 $cm^2$ to 1.89 $cm^2$. The use of thinner sulfur-containing plates resulted in a somewhat higher percentage of sulfur taking place in the reaction.

The porous substrate materials utilized for these plates must be such that they are relatively corrosion resistant to $Li_xS_y$, are good electrical conductors, and most important, are preferentially wetted or impregnated by either sulfur or the electrolyte. In this manner the sulfur and electrolyte are separated, yet the laminated structure allows for greatly increased sulfur-electrolyte interfacial area, thereby significantly increasing the number of reaction sites. In addition, these sites are all in direct proximity to the substrate material itself which functions as the current collector. The electrolyte-bearing plates are considered to serve only as a means of providing a continuous phase for lithium ion transport to the sulfur-electrolyte interface. Hence, the reactions occur quicker with a greater percentage of sulfur being utilized.

Such substrate materials which are preferentially wetted by sulfur and function well in this invention are shown in Table I. Substrate materials which are preferentially wetted by the various electrolytes and function well in this invention are indicated in Table II.

TABLE I

| | Ranges Tested & Operable | | preferred | |
|---|---|---|---|---|
| | Porosity | Ave. Pore Size | Porosity | Ave. Pore Size |
| Type 302 Stainless Steel Feltmetal | 80–85% | 29–67µ | 80% | 29µ |
| Type 304 Stainless Steel Feltmetal 80–85% | | 29–67µ | 80% | 29µ |
| Graphite | 48–92% | 30–200µ | <60% | <90µ |
| Carbon | 49% | 3.5µ | 49% | 3.5µ |

TABLE II

| | Ranges Tested & Operable | | preferred | |
|---|---|---|---|---|
| | Porosity | Ave. Pore Size | Porosity | Ave. Pore Size |
| Type 302 Stainless Steel Feltmetal | 80–85% | 25–40µ | 80% | 30µ |
| Type 304 Stainless Steel Feltmetal | 80–85% | 25–40µ | 80% | 30µ |
| Molybdenum foam | 70–82% | 25–50µ | 78% | 25µ |
| Chromium foam | 68% | 25µ | 68% | 25µ |
| Niobium expanded metal mesh | 76% | (0.24 cm die size) | 76% | (0.24 cm die size) |

It should be noted that these materials are generally applicable to all the embodiments of this invention and are not limited merely to that shown in FIG. 2. It should also be noted that while the materials shown in Tables I and II have been tested and utilized in this invention, the present invention is not limited to such, since other materials having similar properties but not tested might also prove usable in this invention. Preferences of material type for the various embodiments will be indicated below.

Returning to the laminated structure of FIG. 2, plates 34 may be formed from any material shown in Table I, while plates 36 may similarly be formed from any material shown in Table II. However, the preferred structure utilizes carbon or graphite, both of which work equally well, for plates 34 and molybdenum foam for plates 36.

Figure 3:
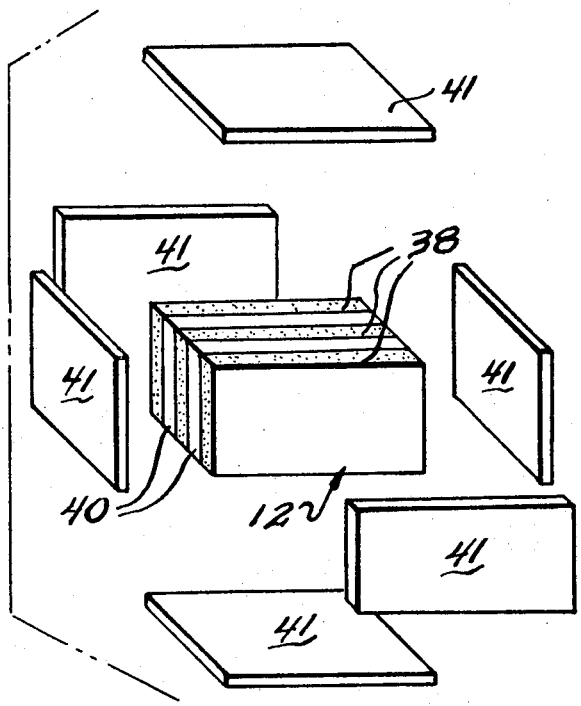
FIG. 3 is an exploded view of an embodiment of the present invention including an enclosed laminated cathode.

FIG. 3 illustrates another embodiment of the present invention wherein cathode 12 comprises sulfur-impregnated plates 38 alternated with electrolyte-impregnated plates 40, similar to FIG. 2. Plates 38 may be formed from any of the materials indicated in Table I, while plates 40 may be made from Feltmetal, molybdenum foam, and chromium foam from Table II, as well as porous niobium (85–92 percent porosity, 30–40 $\mu$ ave. pore size). In this embodiment there is one more sulfur-containing than electrolyte-containing plate. In addition, this structure is entirely enclosed by layers 41 composed of a porous substrate material impregnated with electrolyte. Substrate materials which may comprise layers 41 and have shown to function favorably are molybdenum foam and chromium foam from Table II, as well as porous niobium (85–92 percent porosity, 30–40 $\mu$ ave. pore size). The preferred materials for the embodiment of FIG. 3 are plates 38 of graphite and plates 40 and layers 41 of molybdenum foam. It was found that, while the embodiment of FIG. 2 functioned quite well, a portion of the sulfur was diffusing from cathode 12 into the electrolyte and subsequently vaporizing. Layers 41 eliminate this loss of sulfur from cathode 12 and therefore increase the cell's cycle life.

Figure 4:
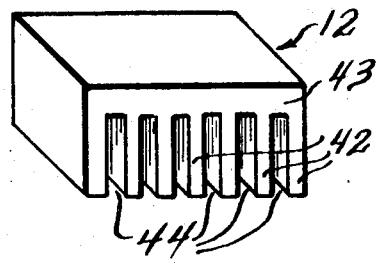
FIG. 4 is a view of an embodiment of the present invention including a comb cathode.

FIG. 4 illustrates a further embodiment of the invention. Cathode 12 includes plates 42 of a porous substrate material impregnated with sulfur joined to plate 43 of the same sulfur-impregnated material, forming thereby a comb-like structure. Slots 44 are filled with the electrolyte itself which enables direct contact between the electrolyte and the surfaces of the sulfur-bearing plates. For testing purposes, this structure was placed in a housing (not shown) such as previously described for the structure shown in FIG. 2. Plates 42 and 43 may be constructed from any of the materials shown in Table I. Graphite, however, is the preferred material for this embodiment. This comb structure embodies the same concept as the previous structures, but the elimination of the electrolyte-containing materials between the sulfur-bearing plates decreases the cathode weight and allows better access of the electrolyte to the sulfur at the surface of the current collector. While this embodiment gave a good performance in terms of capacity and current densities, there was a tendency for the sulfur to be lost from the structure, thereby limiting somewhat the cycle life. To eliminate this sulfur loss, the entire comb structure is flame-sprayed with a very thin coating (not shown), approximately one-third to one-half mm, of a porous material which is well wetted by electrolyte. Examples of such materials are molybdenum, chromium, aluminum nitride, yttria and other corrosion-resistant ceramics. This thin coating keeps the sulfur from diffusing into the electrolyte, yet allows virtually free access by the electrolyte to the current collector surfaces.

Figure 5:
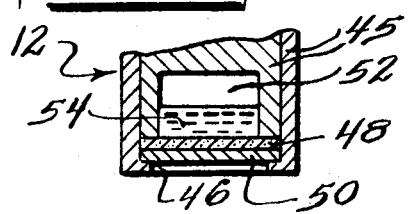
FIG. 5 is a view of an embodiment of the present invention including a reservoir cathode.

FIG. 5 is yet another embodiment of the present invention. This embodiment, however, utilizes a liquid sulfur reservoir rather than having all the sulfur impregnated in porous plates. Cathode 12 comprises a housing 45 constructed from any electrically-conducting material which is resistant to sulfur, $Li_xS_y$ and the electrolyte. Examples of such materials are molybdenum, niobium, chromium, high-density carbon and chrome-plated metals. Housing 45 contains an orifice 46. Plate 48 constructed from porous substrate material impregnated with sulfur is attached to housing 45 in such a manner as to seal orifice 46. Materials from Table I which may be utilized for plate 48 are graphite and carbon. Layer 50 is mounted to the exterior surface of plate 48 and is constructed from porous substrate material impregnated with electrolyte. Layer 50 is necessary in order to keep the sulfur from diffusing into the electrolyte and thereby being lost from cathode 12. The materials from which layer 50 may be made are molybdenum foam and chromium foam from Table II, as well as porous niobium (85–92 percent porosity, 30–40 $\mu$ ave. pore size). The preferred materials for plate 48 and layer 50 are carbon and molybdenum foam, respectively. Enclosure 52 contains liquid sulfur 54 which remains in continual contact with the inner surface of plate 48. As the sulfur in plate 48 is depleted upon cell discharge due to the formation of $Li_xS_y$, liquid sulfur 54 diffuses into plate 48, thereby continually supplying sulfur for cathode reaction (3). This enables high utilization of the sulfur in the cathode.

The anode was formed in one of two manners. Initially, the anode was formed by soaking the Feltmetal in molten lithium at 550°C., removing any excess lithium, cooling the anode to room temperature and placing it in the anode cup. This procedure was changed slightly during the testing period to provide a somewhat stabler anode. The Feltmetal was heated separately to approximately 550°C., then the lithium was added and melted into the Feltmetal The amount of lithium soaked into the Feltmetal depended upon the amount of sulfur which was to be utilized in the cathode. Assuming an end product of $Li_2S$, a 50 percent excess over the theoretical amount required to react with all the sulfur in the cathode was melted into the Feltmetal. The anode area facing the cathode was on the average 0.7 to 2.7 cm$^2$.

For the cathode, sulfur was soaked into the appropriate material by placing that material in liquid sulfur at 100° to 250°C. for approximately one hour. Electrolyte was soaked into the appropriate material by placing that material in liquid electrolyte at 400°C. for 3 to 4 hours. Upon cooling to room temperature, these sulfur and electrolyte-impregnated structures were ready to be utilized for the cathode. The amount of sulfur in the cathode structure was usually 0.3 to 0.6 g/cm$^2$, which corresponds to a theoretical capacity density of 0.5 to 1.0 A-hr/cm$^2$ (if 100 percent of the sulfur is utilized). The amount of electrolyte soaked into the appropriate structures was unimportant, so long as the structures were completely permeated by the electrolyte.

In assembling and testing the various cells, the electrolyte was first melted in the alumina or niobium crucible. The anode was then immersed in the electrolyte, followed by immersing the cathode. The distance between the anode and cathode was usually 1 cm. This procedure as well as the actual testing of the cell was performed in a glovebox containing a high-purity (< 2 ppm each of $O_2$ and $N_2$; < 1 ppm $H_2O$) helium atmosphere. The cell was then heated to operating temperature, approximately 380°–400°C., and discharged totally, measuring the output of the cell during discharge. The cell was then recharged and once again discharged totally. This procedure was continued until the cell was no longer operable. Electrical performance measurements on the cells were made with the aid of a regulated dc power supply, precision shunts, ammeters (±0.25%), voltmeters (±0.25%), a rapid-response strip-chart recorder (±0.3 percent), and a mercury-wetted relay.

In this continuing series of experiments, a great number of cells having the cathode configurations of FIGS. 2 through 5 utilizing the various materials shown in Tables I and II were tested. Due to the great number of cells tested, the results for only a representative portion of the tested cells will be discussed. Cells having the cathode configuration of FIG. 2 generally gave very satisfactory performances. This cathode structure was designed with a high surface-to-volume ratio (as were the other embodiments) to improve the capacity density. Capacity densities as high as 0.523 A-hr/$cm^2$ at current densities of around 0.5 A/$cm^2$ were achieved. Cell number 28 in this series, the first cell tested with the configuration of FIG. 2, had a cathode containing 9 plates, 11 × 11 × 1.6 mm, of Type 302 stainless steel Feltmetal (80 percent porosity, 30 $\mu$ pore size), 5 soaked with LiBr-RbBr electrolyte and 4 soaked with 1.23 g of sulfur, and was operated at 385°C. through several cycles. The electrolyte composition utilized was 59.0 mol % LiBr-41.0 mol % RbBr, and the cell had a theoretical capacity density of 1.29 A-hr/$cm^2$. The projected cathode area was 0.71 $cm^2$, while the actual area available for reaction was 10.6 $cm^2$. At a current density of 0.30 A/$cm^2$, a capacity density of 0.328 A-hr/$cm^2$ above a 1 volt cut-off was achieved. However, the cell's performance deteriorated rapidly after only a few cycles due to corrosion of the stainless steel components. The loss of capacity was attributed to the formation of corrosion products.

Cell number 37 also had a 9 plate cathode of the same Feltmetal as above and was operated at 395°C. with the same LiBr-RbBr electrolyte composition. This cathode, however, had 4 sulfur-impregnated plates of 11 × 11 × 1.6 mm and 5 electrolyte-impregnated plates of 11 × 11 × 0.45 mm, giving a projected cathode area of 0.96 $cm^2$. 1.18 g of sulfur were utilized in the cathode, resulting in a theoretical capacity density of 2.06 A-hr/$cm^2$. At a current density of 0.52 A/$cm^2$, this particular cell achieved a capacity density of 0.523 A-hr/$cm^2$ (with a 25.4% sulfur utilization) above a 1 volt cut-off. This was the best over-all performance achieved up to that point and indicated that increased cell performance could be obtained by reducing the thickness of the electrolyte layers. Voltage vs. current density curves for cell 37 are shown in FIG. 6. However, the performance of this cell also degraded during operation, and, upon disassembly, it was found that the sulfur-electrolyte plates were not firmly connected. It is believed that this gradual loosening along with some sulfur vaporization losses contributed to the decreased cycle life.

Another cell having the cathode configuration of FIG. 2, cell number 44, was constructed utilizing a cathode having 4 sulfur-containing graphite (64% porosity, 1.4 $\mu$ pore size) plates, each 11 × 11 × 0.91 mm, and five 59.0 mol % LiBr-41.0 mol % RbBr electrolyte-containing Feltmetal (Type 302 stainless steel, 80 percent porosity, 30 $\mu$ ave. pore size) plates, each 11 × 11 × 1.6 mm. The cathode contained 0.60 g sulfur, giving a 0.76 A-hr/$cm^2$ theoretical capacity density. The projected cathode area was 1.31 $cm^2$, the cell being cycled a total of 26 times at a temperature of 390°–400°C. At a current density of 0.25 A/$cm^2$, a capacity density of 0.33 A-hr/$cm^2$ above a 1 volt cut-off was achieved. Although these values were not quite as high as those for cells 28 and 37, the cycle life was appreciably longer. In addition, there were several significant observations made with this cell. At a constant current density of 0.5 A/$cm^2$, the capacity density increased with cycling. The two possible explanations for this are that the deterioration of the Feltmetal plates (due to a slow corrosion by the electrolyte) provided greater sulfur and reaction-product mobility, or that the wetting of graphite by sulfur improves with time. Also, the cell was allowed to cool and solidify, and the subsequent discharge after reheating was better than the previous one, indicating thereby that these cells can be shut down and restarted without difficulty. Finally, this particular cell yielded one of the highest sulfur utilizations obtained, 44.2 percent above the 1 volt cut-off.

Cell number 47 also had a laminated cathode structure according to FIG. 2. The cathode comprised 5 sulfur-containing graphite (64 percent porosity, 1.4 $\mu$ ave. pore size) plates, each 11 × 11 × 0.91 mm, and LiCl-KCl electrolyte-containing molybdenum foam (75 percent porosity, 20 $\mu$ ave. pore size) plates, each 11 × 11 × 1.6 mm. The electrolyte composition was 57.5 mol % LiCl-42.5 mol % KCl. 0.66 g of a sulfur compound was utilized in the cathode, giving a 0.50 A-hr/$cm^2$ theoretical capacity density. The projected cathode area was 1.75 $cm^2$, and the cell was operated at a temperature of 390°–400°C. The performance of this cell was not satisfactory. At a current density of 0.32 A/$cm^2$, a capacity density of only 0.087 A-hr/$cm^2$ above a 1 volt cut-off was achieved. However, it was concluded that this poor performance was not the result of utilizing molybdenum foam plates, for it has been found that molybdenum foam is an exceptionally good material for preferential wetting by the various electrolytes. Cell 47 did utilize $P_4S_{10}$ in the cathode in lieu of the pure sulfur used with the other cells, and this might have accounted for the cell's poor performance. It should be noted, though, that this cell did achieve a cycle life of 35 cycles.

Although the cells having the laminated cathode structure of FIG. 2 generally worked well, there still remained some sulfur leakage which limited cycle life. Therefore, this structure was entirely enclosed in a layer of porous electrolyte-impregnated material, as indicated in FIG. 3, in order to inhibit any migration of sulfur from the cathode into the electrolyte. Cell number 55 incorporated the cathode structure shown in FIG. 3. The cathode comprised 3 sulfur-containing graphite (63 percent porosity, 1.4 $\mu$ ave. pore size) plates, each 1.63 × 0.95 × 0.15 cm, 2 LiCl-LiI-KI electrolyte-containing molybdenum foam (78.2 percent porosity, 25 $\mu$ ave. pore size) plates, each 1.63 × 0.95 × 0.15 cm, and 6 LiCl-LiI-KI electrolyte-containing molybdenum foam (78.2 percent porosity, 25 $\mu$ ave. pore size) plates or layers which enclosed the above 5 plates so as to form a cathode 2.1 cm × 1.2 cm × 1.21 cm height. The graphite plates contained 0.51 g sulfur, giving a theoretical capacity density of 0.334 A-hr/cm². The LiCl-LiI-KI electrolyte had a composition of 8.5 mol % LiCl-59.0 mol % LiI-32.5 mol % KI. The projected cathode area was 2.53 cm², and the operating temperature was 380°C. The best capacity density obtained from this cell was 0.163 A-hr/cm² above a 1 volt cut-off at a current density of 0.2 A/cm². FIG. 7 gives voltage vs. capacity density curves for this cell. This low capacity density however, was the result of a relatively larger spacing between the sulfur-containing plates of this cell as compared to the other cells as well as internal short circuits which occasionally occurred as a result of the anode current collector structure being inadequate for redeposition and containment of lithium over a large number of cycles, thereby indicating that porous stainless steel may not be the best material for use in an actual vehicle battery. The cycle life of this cell reached a total of 803 cycles, which indicates that the porous molybdenum enclosure was effective in confining the sulfur within the cathode over an extended period of time. It is obvious from this test that an acceptable anode structure must be designed if a lithium/sulfur cell having the required capacity and current densities over an extended period of time is to be obtained. The cathode structures of the present invention, while very adequate for such a cell, must be utilized with similarly adequate anode structures if the present invention is to be totally effective.

Cell 57, having a somewhat larger-scale cathode structure, also contained a cathode having the configuration shown in FIG. 3 with the exception that the plates were round rather than square. The cathode comprised 5 sulfur-containing graphite (48 percent porosity, 33 $\mu$ ave. pore size) disks, 4.1 cm in diameter and 0.48 cm thick, and 4 LiCl-LiI-KI electrolyte-containing molybdenum foam (78.2 percent porosity, 25 $\mu$ ave. pore size) disks, 4.1 cm in diameter and 0.16 cm thick. This stack was completely encased in molybdenum foam (78.2 percent porosity, 25 $\mu$ ave. pore size), 0.48 cm thick, soaked with the LiCl-LiI-KI electrolyte. The graphite disks contained 19.40 g of sulfur, and the anode contained 14.42 g of lithium. The LiCl-LiI-KI electrolyte composition was the same as that for cell 55. The projected cathode area was 20.0 cm², and the cell was operated at 380°C. The performance of this cell was quite good, giving a capacity density above 1 volt of 0.60 A-hr/cm² at a current density of 0.20 A/cm².

The embodiment shown in FIG. 4 also resulted in good cell performance. Cell 45 contained such a cathode structure made from sulfur-impregnated graphite (63 percent porosity, 1.4 $\mu$ ave. pore size), the cathode being 1.3 cm high, 1.3 cm deep and 1.9 cm wide. There were 7 slots, approximately 0.08 cm wide, 1.0 cm high and 1.3 cm deep, filled with the electrolyte, 59.0 mol % LiBr-41.0 mol % RbBr. The graphite comb was soaked with 1.64 g of sulfur, giving a theoretical capacity density of 1.45 A-hr/cm². The projected cathode area was 1.89 cm², and the operating temperature was 395°C. The performance of this cell was very good, yielding a capacity density above 1 volt of 0.40 A-hr/cm² at a current density of 0.53 A/cm². FIG. 8 shows the voltage vs. capacity density curve for this cell. This particular embodiment was an attempt to reduce the weight of the cell by eliminating the electrolyte-containing substrate plates and allowing direct contact between the electrolyte and the sulfur-bearing plates. This did result, however, in a lower cycle life due to some sulfur loss. This cell demonstrated that the pore diameter could affect the ability of the cathode to retain the reaction products because of its effect on both diffusion rate and the geometry of the reaction sites. It is felt that the sulfur loss which occurred can be remedied by flame-spraying the surfaces of the entire structure with a very thin, approximately ⅛ ½ mm, coating of a porous material, such as molybdenum, which is thoroughly wettable by electrolyte. In this manner, the sulfur will not be lost into the electrolyte.

Another cell which gave extremely good results and had a cathode with the reservoir configuration of FIG. 5 was cell 56. Cell 56 had a cathode comprising a niobium housing with an inner sulfur-containing carbon (49 percent porosity, 3.5 $\mu$ ave. pore size) plate and an outer LiCl-LiI-KI electrolyte-containing molybdenum foam (78.2 percent porosity, 25 $\mu$ ave. pore size) plate. The enclosure contained 1.22 g of sulfur, a theoretical capacity density of 2.04 A-hr/cm². The electrolyte composition was 8.5 mol % LiCl-59.0 mol % LiI-32.5 mol % KI. The projected cathode area was 1 cm², and the cell was operated at 380°C. The capacity density was relatively low, < 0.06 A-hr/cm², until cycle number 100 at which point it began to improve. By cycle number 193 the capacity density had increased to 0.55 A-hr/cm² above 1 volt at a current density of 0.165 A/cm². During cycle number 207 the cell achieved a capacity density of 0.52 A-hr/cm² above a 1 volt cut-off at a current density of 0.27 A/cm². In addition, cell 56 attained a cycle life of 600 cycles. FIG. 9 shows a few voltage vs. capacity-density curves for cell 56.

It is clear from the series of cells tested and discussed above that with proper care and design, lithium/sulfur electrochemical cells can be operated for at least several hundred cycles. A capacity density of 0.5 A-hr/cm² above a 1 volt cut-off has been achieved at a current density of 0.5 A/cm². Peak power densities of more than 3 W/cm² can be sustained by fully-charged individual cells for short periods of time. A series of lithium/sulfur cells connected together and utilizing the present invention could be used as a battery to provide useful power for any number of purposes.

It will be understood that the invention is not to be limited to the details given herein but that it may be modified within the scope of the appended claims.

The embodiments of the invention in which an exclusive property or privilege is claimed are defined as follows:

1. In a secondary electrochemical power-producing cell comprising an anode containing lithium, an electrolyte containing lithium ions, and a cathode containing sulfur, the improvement wherein said cathode comprises a plurality of essentially parallel plates composed of a porous substrate material impregnated with sulfur in alternation with a plurality of layers containing said electrolyte.

2. The improvement of claim 1 wherein said electrolyte-containing layers comprise plates composed of a porous substrate material impregnated with said electrolyte, there being one more electrolyte-impregnated than sulfur-impregnated plate.

3. The improvement of claim 2 wherein said porous substrate material impregnated with sulfur is selected from the group consisting of porous graphite, porous carbon, and porous stainless steel.

4. The improvement of claim 3 wherein said substrate material impregnated with electrolyte is selected from the group consisting of molybdenum foam, chromium foam, niobium expanded metal mesh, and porous stainless steel.

5. The improvement of claim 4 wherein said substrate material impregnated with sulfur is porous graphite and said substrate material impregnated with electrolyte is molybdenum foam.

6. The improvement of claim 1 wherein said electrolyte-containing layers comprise plates composed of a porous substrate material impregnated with said electrolyte, there being one more sulfur-impregnated than electrolyte-impregnated plate, and wherein said cathode is entirely enclosed in a layer of porous substrate material impregnated with said electrolyte entirely sealing each sulfur-impregnated plate within electrolyte-impregnated porous substrate material.

7. The improvement of claim 6 wherein said substrate material impregnated with sulfur is porous graphite or porous carbon.

8. The improvement of claim 7 wherein said substrate material impregnated with electrolyte is selected from the group consisting of molybdenum foam, chromium foam, and porous niobium.

9. The improvement of claim 8 wherein said substrate material impregnated with sulfur is porous graphite and said substrate material impregnated with electrolyte is molybdenum foam.

10. The improvement of claim 1 wherein said essentially parallel sulfur-impregnated plates are joined to the surface of a plate composed of the same porous substrate material impregnated with sulfur, the plane of said surface being essentially perpendicular to the plane of said parallel plates.

11. The improvement of claim 10 wherein said porous substrate material is porous graphite or porous carbon.

12. The improvement of claim 10 wherein all surfaces of said cathode are coated with a thin layer of porous substrate material impregnated with electrolyte.

13. The improvement of claim 12 wherein said porous substrate material impregnated with sulfur is porous graphite, and wherein all surfaces of said sulfur-impregnated porous graphite cathode are coated with a 0.33–0.50 mm layer of molybdenum impregnated with electrolyte.

14. The improvement of claim 1 wherein said electrolyte contains a lithium halide.

15. The improvement of claim 14 wherein said electrolyte is selected from the group consisting of LiF-LiCl-KCl, LiCl-KCl-KI, LiCl-KCl-CsCl, and LiF-LiCl-KCl-KI.

16. In a secondary electrochemical power-producing cell comprising an anode containing lithium, an electrolyte containing lithium ions, and a cathode containing sulfur, the improvement wherein said cathode comprises a housing of electrically-conducting, sulfur and Li$_2$S-resistant material having an orifice at one end, a plate of porous substrate material impregnated with sulfur secured to said housing and sealing said orifice, a layer of porous substrate material impregnated with electrolyte mounted on the exterior surface of said sulfur-impregnated plate, and liquid sulfur located within the enclosure of said housing in contact with the inner surface of said sulfur-impregnated plate.

17. The improvement of claim 16 wherein said housing material is selected from the group consisting of molybdenum, niobium, chromium, high-density carbon, and chrome-plated metals.

18. The improvement of claim 17 wherein said porous substrate material impregnated with sulfur is porous graphite or porous carbon.

19. The improvement of claim 18 wherein said porous substrate material impregnated with electrolyte is selected from the group consisting of molybdenum foam, chromium foam, and porous niobium.

20. The improvement of claim 19 wherein said housing material is niobium, said porous substrate material impregnated with sulfur is porous carbon, and said porous substrate material impregnated with electrolyte is molybdenum foam.

21. The improvement of claim 16 wherein said electrolyte contains a lithium halide.

22. The improvement of claim 21 wherein said electrolyte is selected from the group consisting of LiF-LiCl-KCl, LiCl-KCl-KI, LiCl-KCl-CsCl, and LiF-LiCl-KCl-KI.

* * * * *